UNITED STATES PATENT OFFICE.

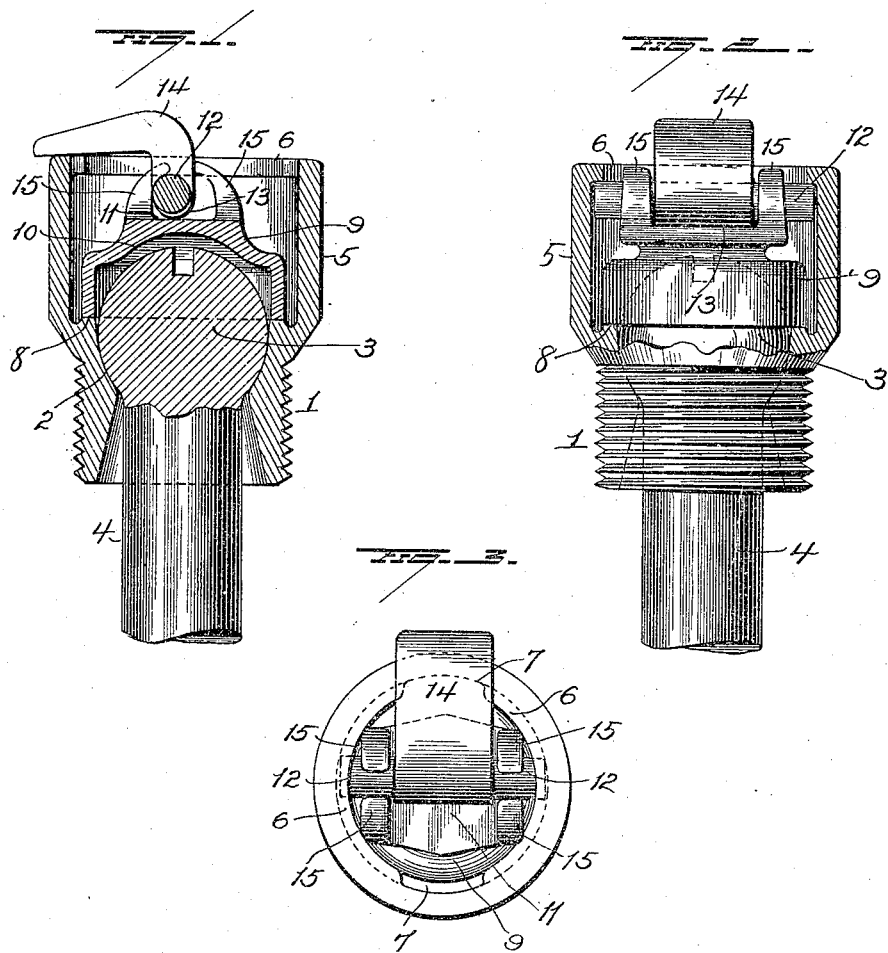

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,293,373.  Specification of Letters Patent.  Patented Feb. 4, 1919.

Application filed April 26, 1918. Serial No. 230,920.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers and more particularly to the means for closing the end of the bearing sleeve over the end of the staybolt,—the object of the invention being to provide simple closure devices for the bearing sleeve, which can be quickly removed to expose the head of the bolt, and which will operate normally to tightly seal the end of the bearing sleeve.

With this and other objects in view, the invention consists in certain novel features of construction and combinations of parts as hereinafter set forth and pointed out in the claims.

In the accompanying drawings, Figure 1 is a longitudinal sectional view of a staybolt structure showing an embodiment of my invention. Fig. 2 is a view partly in section taken at right angles to Fig. 1, and Fig. 3 is a plan view.

1 represents a bearing sleeve provided interiorly with a curved face 2 serving as a bearing for the rounded or spherical head 3 of a staybolt 4.

The bearing sleeve 1 is provided at its outer end with an annular flange or extension 5 having at its free end internal shoulders 6 spaced apart so as to form notches 7 between them. Within the confines of the annular flange or extension 5, the bearing sleeve is provided with a seat 8 for the accommodation of a cap or closure 9. This cap or closure is made of resilient metal and formed with a partly spherical recess which provides a suitable clearance space 10 for the head of the bolt. The top of the cap 9 is made with a flat face 11 and the peripheral portion of said cap has a wall which is at right angles to the flat top 11 so that if pressure be applied to the flat top 11 of the cap, the resilience of the cap will cause the latter to press tightly against its seat. For applying such pressure to the cap, I provide a bar 12 bearing against the inner faces of the segmental shoulders 6 and having a cam 13 to engage the flat face 11 of the cap,—said bar being provided with a lever 14 by means of which to turn it. In order to prevent escape of the cam bar and lever from the cap, the latter is provided with pairs of fingers 15 which partially embrace the cam bar as clearly shown in Fig. 1.

The cap or closure having the cam bar connected therewith, is placed within the annular extension 5 of the bearing sleeve and permitted to rest upon the seat 8,—the ends of the cam or locking bar 12 passing through the notches between the segmental shoulders 6. The cap and locking bar are now given a partial rotation so as to bring the ends of the bar 12 behind the segmental shoulders 6. The lever 14 will then be turned to the position shown in Fig. 1, whereupon the cam 13 of said bar engaging the flat face 11 of the cap will force the latter tightly against its seat and the parts will be firmly locked in their normal positions. It is apparent that by moving the lever 14 outwardly pressure of the cap against its seat will be relieved and then by turning the cap and locking bar so that the ends of the latter will aline with the notches 7, the whole can be removed from the bearing sleeve outwardly through the annular extension 5 and the head of the bolt will be exposed for testing purposes. It is clear that by reversing these operations the cap or closure 9 may be quickly replaced and locked into position.

Having fully described my invention what I claim as new and desire to secure by Letters-Patent, is:

1. In a staybolt structure, the combination with a bearing sleeve provided with an annular extension, of a cap seated on the sleeve within said extension, and a manually operable cam bar coöperable with said sleeve extension and cap for forcing the cap against its seat and locking said cap.

2. In a staybolt structure, the combination with a bearing sleeve provided with an annular extension having internal segmental shoulders, of a resilient cap disposed within said extension and seated on the bearing sleeve, a cam bar disposed over said cap and having portions adapted to be disposed behind the segmental shoulders of said annular extension, and a lever for operating said bar.

3. In a staybolt structure, the combination with a bearing sleeve provided with an annular extension having internal segmental shoulders, of a resilient cap disposed within said extension and seated on the bearing sleeve, a cam bar disposed over said cap and having portions to be disposed behind said segmental shoulders, a lever for operating said cam bar, and fingers on the cap for preventing escape of the cam bar and its lever from the cap.

In testimony whereof I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."